(12) United States Patent
Nguyen et al.

(10) Patent No.: US 7,896,929 B2
(45) Date of Patent: Mar. 1, 2011

(54) TREATING TEXTILES WITH SILICONE POLYETHER-AMIDE BLOCK COPOLYMERS

(75) Inventors: Kimmai Thi Nguyen, Midland, MI (US); Lenin Petroff, Bay City, MI (US); Fernando Vazquez, Greensboro, NC (US)

(73) Assignee: Dow Corning Corporation, Midland, MI (US)

( * ) Notice: Subject to any disclaimer, the term of this patent is extended or adjusted under 35 U.S.C. 154(b) by 62 days.

(21) Appl. No.: 12/301,520

(22) PCT Filed: Jun. 1, 2007

(86) PCT No.: PCT/US2007/013070
§ 371 (c)(1),
(2), (4) Date: Nov. 19, 2008

(87) PCT Pub. No.: WO2007/145867
PCT Pub. Date: Dec. 21, 2007

(65) Prior Publication Data
US 2009/0113637 A1    May 7, 2009

Related U.S. Application Data

(60) Provisional application No. 60/811,675, filed on Jun. 7, 2006.

(51) Int. Cl.
*B01D 71/70* (2006.01)
*D06M 13/513* (2006.01)

(52) U.S. Cl. .................. 8/115.64; 8/115.54; 8/115.51

(58) Field of Classification Search ............ 8/115.54
See application file for complete search history.

(56) References Cited

U.S. PATENT DOCUMENTS

| | | | |
|---|---|---|---|
| 3,419,593 A | 12/1968 | Willing | |
| 3,715,334 A | 2/1973 | Karstedt | |
| 3,814,730 A | 6/1974 | Karstedt | |
| 3,923,705 A | 12/1975 | Smith | |
| 3,957,842 A | 5/1976 | Prokai et al. | |
| 4,022,941 A | 5/1977 | Prokai et al. | |
| 4,127,494 A | 11/1978 | Lindenberger | |
| 4,242,466 A | 12/1980 | Schilling, Jr. et al. | |
| 4,833,225 A | 5/1989 | Schaefer et al. | |
| 5,087,520 A | 2/1992 | Suzuki et al. | |
| 5,175,325 A | 12/1992 | Brown et al. | |
| 5,472,686 A | 12/1995 | Tsubaki et al. | |
| 5,660,819 A | 8/1997 | Tsubaki et al. | |
| 5,767,219 A | 6/1998 | Takarada et al. | |
| 5,807,956 A | 9/1998 | Czech | |
| 5,874,069 A | 2/1999 | Mendolia et al. | |
| 5,919,441 A | 7/1999 | Mendolia et al. | |
| 5,981,680 A * | 11/1999 | Petroff et al. | 528/26 |
| 5,981,681 A | 11/1999 | Czech | |
| 6,051,216 A | 4/2000 | Barr et al. | |
| 6,475,568 B1 | 11/2002 | Czech | |
| 6,649,689 B2 * | 11/2003 | Gosselink et al. | 524/588 |
| 6,649,692 B2 | 11/2003 | Yu et al. | |
| 6,800,713 B2 | 10/2004 | Cook et al. | |
| 6,835,419 B2 | 12/2004 | Herzig et al. | |
| 6,838,541 B2 | 1/2005 | Lin et al. | |
| 6,878,770 B2 | 4/2005 | Herzig et al. | |
| 7,019,098 B2 | 3/2006 | Hupfield | |
| 7,153,922 B2 | 12/2006 | Hohberg et al. | |
| 2004/0018788 A1 | 1/2004 | Phillips et al. | |
| 2004/0219371 A1 | 11/2004 | Will et al. | |

FOREIGN PATENT DOCUMENTS

| | | |
|---|---|---|
| JP | 5163436 | 6/1993 |
| JP | 7330907 | 12/1995 |
| JP | 9165315 | 6/1997 |
| JP | 9165318 | 6/1997 |
| JP | 9183854 | 7/1997 |
| JP | 9296045 | 11/1997 |
| JP | 10140485 | 5/1998 |
| JP | 11335463 | 12/1999 |
| WO | WO2006/060295 | 6/2006 |

* cited by examiner

*Primary Examiner* — Harold Y Pyon
*Assistant Examiner* — Katie Hammer
(74) *Attorney, Agent, or Firm* — Alan Zombeck

(57) ABSTRACT

A method of treating textiles with a silicone block copolymer containing polyether-amide units is disclosed. Textiles treated with the silicone block copolymer have a feel or hand comparable to conventional hydrophobic silicones, but do not negatively impact the hydrophilicity of the textile.

7 Claims, No Drawings

TREATING TEXTILES WITH SILICONE POLYETHER-AMIDE BLOCK COPOLYMERS

CROSS REFERENCE TO RELATED APPLICATIONS

This application is a U.S. national stage filing under 35 U.S.C. §371 of PCT Application No. PCT/US07/013070 filed on Jun. 1, 2007, currently pending, which claims the benefit of U.S. 60/ Patent Application No. 60/811,675 filed Jun. 7, 2006 under 35 U.S.C. §119 (a)-(d) and 35 U.S.C. §365(a). PCT Application No. PCT/US07/013070 and Patent Application No. 60/811,675 are hereby incorporated by reference.

TECHNICAL FIELD

The present invention relates to a method of treating textiles with a silicone block copolymer containing polyether-amide units. Textiles treated with the silicone block copolymer have a feel or hand comparable to conventional hydrophobic silicones, but do not negatively impact the hydrophilicity of the textile.

BACKGROUND

Silicone polyamide copolymers have found widespread use in various commercial formulations. In particular, silicone polyamide copolymers have found utility in personal care formulations for their ability to act as a "structuring" or "gelling" agent in a composition containing a silicone, especially volatile silicones. The following summarizes representative examples of such patent references.

U.S. Pat. No. 5,874,069 teaches a base composition and corresponding cosmetic composition which can be formed as solids (for example, gels or sticks) and which comprise a solvent which includes a silicone fluid (for example, a silicone oil such as cyclomethicone) and a thickening agent formed from a wax and a polyamide gellant wherein at least one of the wax and polyamide includes silicon-containing moieties.

U.S. Pat. No. 5,919,441 discloses compositions which comprises gelling agents which (1) contain both siloxane groups and hydrogen-bonding groups to thicken compositions containing silicone fluids (volatile and/or non-volatile silicone fluids); (2) are non-flowable solids at room temperature; and (3) dissolve in a fluid which contains silicone at a temperature of 25-250° C. to form a translucent or clear solution at a temperature in this range.

U.S. Pat. No. 6,051,216 disclose siloxane-based polyamides as gelling agents for cosmetic products, methods for making such agents, formulations thereof and cosmetic formulations therewith. The polyamides according to the '216 patent contain siloxane groups in the main chain and act to thicken compositions containing volatile and/or non-volatile silicone fluids.

More recently, silicone polyamides containing polyether groups were disclosed in PCT/US05/042858, filed Nov. 28, 2005. The present inventors have discovered the silicone block copolymer having at least one repeating polyether-amide unit, as disclosed in PCT/US05/042858, possess unexpected benefits for the treatment of textiles.

SUMMARY

The present invention relates to a method of treating a textile comprising applying to the textile a silicone block copolymer having at least one repeating polyether-amide unit represented by the formula

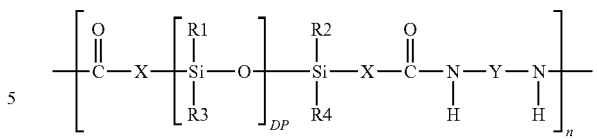

wherein
X is a linear or branched $C_1$-$C_{30}$ alkylene chain;
Y is a divalent organic group containing at least one polyoxyalkylene group having the formula —$(C_mH_{2m}O)_z$—, where m is 2 to 4 inclusive, z is 1 to 700,
$R^1$-$R^4$ are independently a monovalent organic group;
DP is an integer having a value of 1-500;
and n is an integer having a value of 1-500.

DETAILED DESCRIPTION

The silicone block copolymers of the present invention have at least one repeating polyether-amide unit represented by the formula (Formula A);

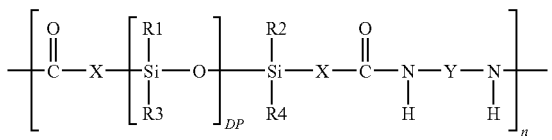

wherein
X is a linear or branched $C_1$-$C_{30}$ alkylene chain;
Y is a divalent organic group containing at least one polyoxyalkylene group having the formula —$(C_mH_{2m}O)_z$—, where m is 2 to 4 inclusive, z is 1 to 700,
$R^1$-$R^4$ are independently a monovalent organic group;
DP is an integer having a value of 1-500;
and n is an integer having a value of 1-500.

In Formula A, X is a linear or branched $C_1$-$C_{30}$ alkylene chain, thus X may be a divalent, aliphatic hydrocarbon group having 1-30 carbons, alternatively having 3-10 carbons, or alternatively having 10 carbons such as —$(CH_2)_{10}$—.

In Formula A, Y is a divalent organic group containing at least one polyoxyalkylene group having the formula —$(C_mH_{2m}O)_z$—, where m is 2 to 4 inclusive, z is 1 to 700, alternatively 1 to 100, or alternatively 1 to 20. The polyoxyalkylene group typically can comprise oxyethylene units —$(C_2H_4O)$—, oxypropylene units —$(C_3H_6O)$—, oxybutylene units —$(C_4H_8O)$—, or mixtures thereof. If more than one oxyalkylene group is present, the oxyalkylene units can be arranged in any fashion to form either a block or randomized copolymer structure, or alternatively form a randomized copolymer group. Typically, the polyoxyalkylene block comprises both oxyethylene units ($C_2H_4O$) and oxypropylene units ($C_3H_6O$). The polyoxyalkylene group may be bonded to each of the nitrogen atoms in Formula A via a divalent hydrocarbon group, which is typically an isopropylene group, —$CH(CH_3)CH_2$—, or ethylene group —$CH_2CH_2$—.

Each of $R^1$-$R^4$ in Formula A is independently selected from a monovalent organic group. These monovalent organic groups may have from 1 to 20 carbon atoms, alternatively 1 to 10 carbon atoms, and are exemplified by, but not limited to alkyl groups such as methyl, ethyl, propyl, butyl, pentyl, hexyl, heptyl, octyl, undecyl, and octadecyl; cycloalkyl such as cyclohexyl; aryl such as phenyl, tolyl, xylyl, benzyl, and 2-phenylethyl; and halogenated hydrocarbon groups such as 3,3,3-trifluoropropyl, 3-chloropropyl, and dichlorophenyl. At least 50 percent, alternatively at least 80%, of the organic groups in each of $R^1$-$R^4$ in Formula A may be methyl (denoted as Me). Typically, the siloxane block, as designated in Formula A as

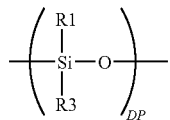

is a predominately linear polydimethylsiloxane having the formula $(Me_2SiO)_{DP}$, where DP is as defined below.

DP may range from 1 to 700, alternatively 7-500, or alternatively 7-150. In this context, DP represents an average value for degree of polymerization of the siloxane units as shown in Formula A with this average being a number average based on all the siloxane segments in all units of Formula A in the material considered.

In Formula A, the integer n may range from 1 to 500, alternatively 1-100, or alternatively 4-25.

If repeated with no variations in the defined variables, Formula A is representative of a linear block copolymer. Variations of the invention include: (1) polyamides in which multiple values of DP, and of units X, Y, and $R^1$-$R^4$ occur in one polymeric molecule, and wherein the sequencing of these units may be alternating, random or block; (2) polyamides in which an organic triamine or higher amine such as tris(2-aminoethyl)amine replaces the organic diamine in part during the preparation of the vinyl endblocked diamide, to produce a branched or crosslinked molecule; and (3) physical blends of any of (1) and (2) and/or linear copolymers.

The silicone block copolymers of the present invention may be illustrated by the following representative, non-limiting, structural formulas, where DP, z, and n are as defined above, EO represents the oxyethylene unit, PO represents the oxypropylene unit, and BO represents the oxybutylene unit;

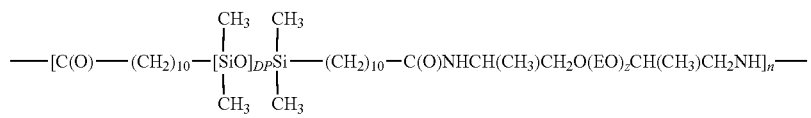

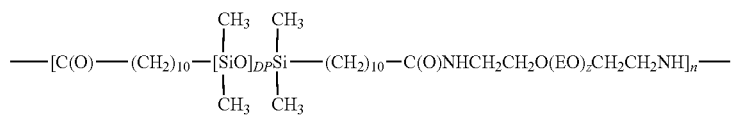

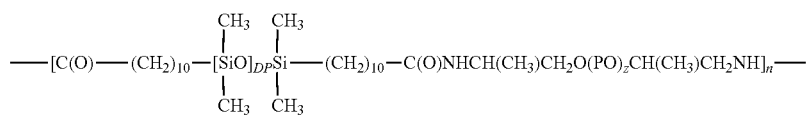

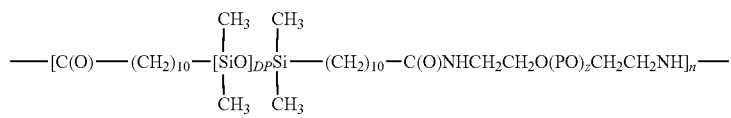

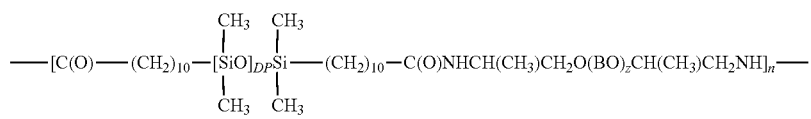

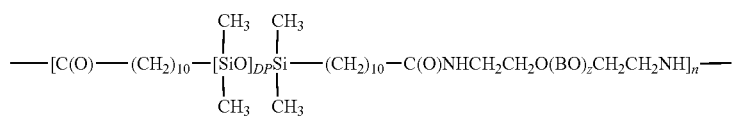

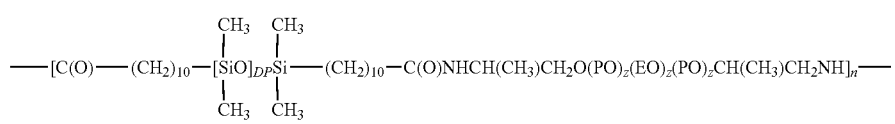

The silicone block copolymers may also contain additional "blocks" or units in its copolymer structure, or alternatively, in a terpolymer structure. These additional blocks may consist of additional alkylene, polyoxyalkenes, or organopolysiloxane units. These additional units may be incorporated into the silicone block copolymers by the use of the corresponding alpha omega olefin during its preparation. Suitable alpha omega olefins are described below.

The silicone block copolymers of the present invention may be prepared by any technique known in the art for preparing such block copolymers, but in particular, may be made by the procedures described in U.S. Pat. No. 6,800,713, which is incorporated herein by reference. When utilizing the procedures of the '713 patent, the silicone block copolymers of the present invention are prepared using polyether-diamines, which are described in more detail below.

The present invention further relates to a process for making a silicone block copolymer comprising;

I) reacting an omega-olefinic carboxylic acid with a diamine containing at least one polyoxyalkylene group having the formula —$(C_mH_{2m}O)_z$—,
where m is 2 to 4 inclusive, z is 1 to 700 to form a vinyl endblocked diamide, II) reacting the vinyl endblocked diamide with an SiH containing siloxane to form the silicone block copolymer.

The first step of the process of the present invention involves the reaction of an olefinic acid with an organic diamine to produce a vinyl endblocked diamide. The reaction of step I) may be conducted in any manner and conditions which are known in the art to effect the formation of amides by reacting a carboxylic acid with an amine. Alternatively, the vinyl endblocked diamide may be a commercial product, and used directly in the present process.

The organic diamide is then in turn reacted with an SiH containing siloxane, such as a hydride-terminated polydimethylsiloxane having an average structure as the one depicted below:

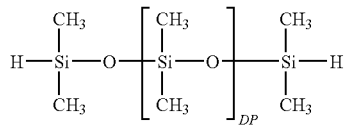

where DP is an integer having a value of 1-500, in the presence of a hydrosilylation catalyst to form a silicone block copolymer which includes at least one repeating unit represented by Formula A, described above.

Suitable omega-olefinic acids which can be used in step I) include undecylenic acid $H_2C\!\!=\!\!CH(CH_2)_8COOH$, acrylic acid $H_2C\!\!=\!\!CHCOOH$, 3-butenoic acid (vinylacetic acid) $H_2C\!\!=\!\!CHCH_2COOH$, 4-pentenoic acid $H_2C\!\!=\!\!CHCH_2CH_2COOH$, and other olefinic acids with carbon chains of varying length.

The diamines of step I, must contain at least one polyoxyalkylene group having the formula —$(C_mH_{2m}O)_z$—, where m is 2 to 4 inclusive, z is 1 to 700. The polyoxyalkylene-diamines are also commonly known as polyetherdiamines, and may be for example poly(oxyethylene)diamines or poly(oxypropylene)diamines. Polyoxyalkylene-diamines are known in the art, and many are commercially available. Representative, non-limiting examples of suitable polyoxyalkylene-diamines include; XTJ-502 Poly(oxyethylene) diamine [CAS 65605-36-9], XTJ-504 Triethyleneglycoldiamine [CAS 929-59-9], JEFFAMINE® HK-511 Polyetherdiamine [CAS 194673-87-5], JEFFAMINE® D-230 Polyoxypropylenediamine [CAS # 9046-10-0], JEFFAMINE®) D-400 POLYOXYPROPYLENEDIAMINE [CAS 9046-10-0], JEFFAMINE® D-2000 POLYOXYPROPYLENEDIAMINE [CAS 9046-10-0]. Additional representative, non-limiting examples of suitable polyoxyalkylene-diamines include the "DPA—Series Ether Amines" from Tomah (Tomah Products, Inc., Milton Wis.). This series of diamines is represented by the general formula; $H_2NCH_2CH_2CH_2$—O—R—O—$CH_2CH_2CH_2NH_2$, where O—R—O represents various glycol moieties, as indicated in parentheses in the following listing of commercial products;

DPA-PG (propylene glycol),
DPA-DPG (dipropylene glycol)
DPA-3PG (tripropylene glycol)
DPA-425 (poly(propylene glycol))
DPA-725 (poly(propylene glycol))
DPA-1000 (poly(propylene glycol))
DPA-1200 (poly(propylene glycol))
DPA-2000 (poly(propylene glycol))
DPA-4000 (poly(propylene glycol))
NDPA-10 (ethylene glycol))
DPA-DEG (diethylene glycol)
DPA-200E (poly(ethylene glycol))
DPA-400E (poly(ethylene glycol))
DPA-1000E (poly(ethylene glycol))
NDPA-11 (1,3-propane diol)
DPA-12 (2-methyl-1,3-propane diol)
NDPA-12 (1,4-butane diol)
IDPA-12 (1,3-butane diol)
NDPA-14 (1,6 hexane diol)
DPA-CHDM (cylclohexane-1,4-dimethanol)

A platinum catalyzed hydrosilylation reaction is typically used to effect the reaction in step II). Hydrosilylations are well known in the art and involves the reaction between a polysiloxane containing ≡Si—H groups, and a material containing unsaturation, e.g., vinyl groups. The reaction typically uses a catalyst to effect the reaction between the ≡SiH containing polysiloxane and the material containing unsaturation, i.e., the organic diamide in the case of the present invention. Suitable catalysts are Group VIII transition metals, i.e., the noble metals. Such noble metal catalysts are described in U.S. Pat. No. 3,923,705, incorporated herein by reference to show platinum catalysts. One preferred platinum catalyst is Karstedt's catalyst, which is described in Karstedt's U.S. Pat. Nos. 3,715,334 and 3,814,730, incorporated herein by reference. Karstedt's catalyst is a platinum divinyl tetramethyl disiloxane complex typically containing one weight percent of platinum in a solvent such as toluene. Another preferred platinum catalyst is a reaction product of chloroplatinic acid and an organosilicon compound containing terminal aliphatic unsaturation. It is described in U.S. Pat. No. 3,419,593, incorporated herein by reference. Most preferred as the catalyst is a neutralized complex of platinous chloride and divinyl tetramethyl disiloxane, for example as described in U.S. Pat. No. 5,175,325.

The noble metal catalyst can be used in an amount of from 0.00001-0.5 parts per 100 weight parts of the ≡SiH containing polysiloxane. Alternatively, the catalyst should be used in an amount sufficient to provide 5-15 parts per million (ppm) Pt metal per total composition.

Carrying out of the reaction of step II) is simply a matter of combining the ≡SiH containing polysiloxane(s), the material containing unsaturation, i.e., the organic diamide, and the catalyst; and mixing these ingredients. The reaction temperature can vary over a wide range, and the optimum temperature is dependent upon the concentration of the catalyst and the nature of the reactants. Ordinarily, it is best to keep the reaction temperature below 300° C. Best results with most reactants can be obtained by initiating the reaction at 80° C. to 180° C., and maintaining the reaction within reasonable limits of this range.

Typically, the process is carried out using approximately a 1:1 molar ratio of ≡Si—H containing polysiloxane and the material containing unsaturation. It is expected that useful materials may also be prepared by carrying out the process with an excess of either the ≡Si—H containing polysiloxane or the material containing unsaturation, but this would be considered a less efficient use of the materials. Typically, the material containing the unsaturation is used in slight excess to ensure all the SiH is consumed in the reaction.

The present invention further relates to a process for making a silicone block copolymer comprising;
I) reacting an omega-olefinic carboxylic acid with a diamine containing at least one polyoxyalkylene group having the formula —$(C_mH_{2m}O)_z$—,
where m is 2 to 4 inclusive, z is 1 to 700 to form a vinyl endblocked diamide,
II) reacting the vinyl endblocked diamide and an alpha-omega olefin with an SiH containing siloxane to form the silicone block copolymer. In this embodiment of the present invention, an alpha-omega olefin is added to step II) of the process, otherwise the techniques and procedures for performing steps I) and II) are the same as described above. As used herein, the alpha-omega olefin may be represented by the general formula $H_2C=CH$-A-$CH=CH_2$, where A represents a divalent organic group or organopolysiloxane. When A is a divalent organic group, it may be selected from linear or branched $C_1$-$C_{30}$ alkylene chains. Thus A may be a divalent, aliphatic hydrocarbon group having 1-30 carbons, particularly 3-10 carbons, and more particularly 4 carbons, for example 1, 5 hexadiene. A may also be a polyether (polyoxyalkylene) group, where the polyoxyalkylenes are as described above. A may also be an organopolysiloxane, and in particular a linear polydimethylsiloxane formula $(Me_2SiO)_{DP}$, where DP is as defined above. The alpha-omega olefin can be added in step II) for the purpose of altering the final chemical/physical properties of the resulting silicone block copolymer.

In a preferred embodiment of the process of the present invention, anyone or all of the starting materials, i.e. the carboxylic acid, diamines, alpha-omega olefin, and SiH siloxanes, are "processed" according to the teachings of U.S. Pat. No. 6,800,713 (which is incorporated by reference) to enhance copolymer formation.

The method of the present invention comprises applying to fibers or textiles the silicone block copolymer, component A), or emulsions thereof, either of which are also referred herein as the treatment composition. The amount applied is a "hand improving" effective amount of the treatment composition and is applied to the fiber and/or textile by any convenient method. Hand for purposes of the invention means the softness and smoothness of the fabric. For example, the treatment composition can be applied by padding, dipping, spraying or exhausting. When the treatment composition comprises more than one solution, dispersion, or emulsion; the solutions, dispersions, and emulsions can be applied simultaneously or sequentially to the textiles. After the treatment composition is applied to the fiber and/or fabric, it can be dried by heat.

The fiber/textile treatment composition can be applied to the fiber and/or textile during making the fibers or textiles, or later such as during laundering textiles. After application, carriers (if any) can be removed from the treatment composition for example by drying the composition at ambient or elevated temperature. The amount of treatment composition applied to the fibers and textiles is typically sufficient to provide 0.1 to 15 weight percent of the composition on the fibers and textiles, based on their dry weight, preferably in an amount of 0.2 to 5 weight percent based on the dry weight of the fiber or textile.

Fibers and textiles that can be treated with the treatment composition include natural fibers such as cotton, silk, linen, and wool; regenerated fibers such as rayon and acetate; synthetic fibers such as polyesters, polyamides, polyacrylonitriles, polyethylenes, and polypropylenes; combinations, and blends thereof. The form of the fibers can include threads, filaments, tows, yarns, woven fabrics, knitted materials, nonwoven materials, paper, carpet, and leather. Textiles treated with the silicone block copolymer, component A), have a feel or hand comparable to conventional hydrophobic silicone, but do not negatively impact the hydrophilicity of the textile.

EXAMPLES

These examples are intended to illustrate the invention to one of ordinary skill in the art and are should not be interpreted as limiting the scope of the invention set forth in the claims. All tests were performed at 23° C., unless indicated otherwise.

The following etherdiamines were used in the Examples below to prepare etherdiamides.

| Etherdiamine | Commercial Supplier/name |
| --- | --- |
| $NH_2CH_2CH_2OCH_2CH_2OCH_2CH_2NH_2$ | Huntsman's XTJ-504 |
| $NH_2(CH_2)_3OCH_2CH_2OCH_2CH_2O(CH_2)_3NH_2$ | Tomah's DPA-DEG |
| $NH_2(CH_2)_3(OCH_2CH_2CH_2)_2NH_2$ | Tomah's DPA-DPG |
| $NH_2CHCH_3CH_2(OCH_2CHCH_3)_{2.6}NH_2$ | JEFFAMINE D-230 |
| $NH_2CH_2CH_2OCH_2CH_2OCH_2CH_2NH_2$ | Huntsman's XTJ-504 |
| $NH_2CCH_3CH_2(OCCH_3CHCH_2)_{2.5}(OCH_2CH_2)_{39.5}(OCH_2CHCH_3)_{2.5}NH_2$ | Huntsman's XTJ-502 |
| $NH_2CH_2CH_2OCH_2CH_2OCH_2CH_2NH_2$ | Huntsman's XTJ-504 |

Example 1

Reference

Preparation of an Etherdiamide

A 1000 mL round bottom flask equipped with a thermometer, electrical stirrer, nitrogen sweep, and a condenser, was charged with 107.22 gram of a polyetherdiamine (Tomah's DPA-DEG, Wisconsin) and 192.79 gram of undecylenic acid (Atofina, France). With the stirring off, the mixture in the flask was purged with nitrogen for 5 minutes to sweep out any oxygen in the headspace. The mixer was then turned on, and the mixture quickly turned to a light yellow color. The reaction mixture was then heated to 180° C. for 2 hours under vacuum with a nitrogen purge to strip out impurities. The reaction mixture was poured onto an aluminum lined pan and allowed to cool in air without any adverse discoloration. The melt temperature of the etherdiamide was 89° C. The acid number of the etherdiamide was 2.03.

Example 1A

Preparation of a Silicone Block Copolymer

A 1000 mL, three neck, round bottom flask equipped with a temperature probe, an electrical stirrer, and a condenser was charged with 50 grams of the etherdiamide from Example 1, and 116.52 gram of a dimethylhydrogen endblocked polydimethylsiloxane having an average degree of polymerization (DP) of 15. The contents were then heated to 140° C. for 15 minutes, then 1.03 gram of a platinum catalyst (1,3-diethenyl-1,1,3,3-tetramethyldisiloxane platinum complex in dimethyl siloxane) was added to the mixture. The mixture was allowed to react for 1 hour. The Mw of the resulting polymer was 17,200 with a polydispersity of 1.87. The melt temperature was 49° C.

Example 1B

Preparation of a Silicone Block Copolymer

A 1000 mL, three neck round bottom flask equipped with a temperature probe, an electrical stirrer, and a condenser was charged with 37.5 grams of the etherdiamide from Example 1, and 550.5 gram of a dimethylhydrogen endblocked polydimethylsiloxane having an average DP of 100, and heated to 140° C. for 15 minutes. Then, 2.0 grams of platinum catalyst (1,3-diethenyl-1,1,3,3-tetramethyldisiloxane platinum complex in dimethyl siloxane) was added to the mixture. The mixture was allowed to react for 1 hour and then poured off. The Mw of the resulting polymer was 56,900 with a polydispersity of 2.11.

Example 2

Preparation of Etherdiamide

A 1000 mL round bottom flask equipped with a thermometer, electrical stirrer, nitrogen sweep, and a condenser, was charged with 114.61 grams of a polyetherdiamine (Huntsman's XTJ-504) and 291.4 gram of undecylenic acid (Atofina, France). With the stirring off, the mixture in the flask was purged with nitrogen for 5 minutes to sweep out any oxygen in the headspace. The mixer was then turned on, and the mixture quickly turned to a light yellow color. The reaction mixture was then heated to 180° C. for 2 hours under vacuum with a nitrogen purge to strip out impurities. The reaction mixture was poured onto an aluminum lined pan and allowed to cool in air without any adverse discoloration. The melt temperature of the etherdiamide was 94° C. The acid number as an indication of the impurities remained in the etherdiamide was 2.31.

Example 2A

Preparation of a Silicone Block Copolymer

A 1000 mL, three neck, round bottom flask equipped with a temperature probe, an electrical stirrer, and a condenser was charged with 70 grams of (etherdiamide made in Example 2), and 182.76 grams of dimethylhydrogen endblocked polydimethylsiloxane having a DP of 15. The mixture was heated to 140° C. for 15 minutes, and then 0.9 gram of platinum catalyst (1,3-diethenyl-1,1,3,3-tetramethyldisiloxane platinum complex in dimethyl siloxane) was added to the mixture. The reaction mixture was allowed to react for 1 hour and then was poured off. The Mw of the resulting polymer was 21,400 with a polydispersity of 2.14. The melt temperature was 65° C.

Example 2B

Preparation of a Silicone Block Copolymer

A 1000 mL, three neck, round bottom flask equipped with a temperature probe, an electrical stirrer, and a condenser was charged with 20 grams of (etherdiamide made in Example 2), and 294.5 grams of dimethylhydrogen endblocked polydimethylsiloxane (average 100 DP), and heated to 140° C. for 15 minutes. Then 0.91 grams of platinum catalyst (1,3-diethenyl-1,1,3,3-tetramethyldisiloxane platinum complex in dimethyl siloxane) were added to the mixture. The reaction mixture was allowed to react for 1 hour and was then poured off. The Mw of the polymer was 89,100 with a polydispersity of 3.88. The melt temperature was 74° C.

Example 3

Preparation of an Etherdiamide

A 2000 mL round bottom flask equipped with a thermometer, electrical stirrer, nitrogen sweep, and a condenser, was charged with 570.0 gram of a polyetherdiamine (Huntsman's XTJ-502) and 100.75 gram of undecylenic acid (Atofina, France). With the stirring off, the mixture in the flask was purged with nitrogen for 5 minutes to sweep out any oxygen in the headspace. The mixer was then turned on, and the mixture quickly turned to a light yellow color. The reaction mixture was then heated to 180° C. for 2 hours under vacuum with a nitrogen purge to strip out impurities. The reaction mixture was poured onto an aluminum lined pan and allowed to cool in air without any adverse discoloration. The melt temperature of the etherdiamide was 31° C. The acid number as an indication of the impurities remained in the etherdiamide was 1.88.

Example 3A

Preparation of a Silicone Block Copolymer

A 500 mL three neck round bottom flask equipped with a temperature probe, an electrical stirrer, and a condenser was charged with 100.0 gram of the etherdiamide made above in Example 3 and 112.0 g toluene, and heated to 112° C., for 15 minutes. Then 52.5 g of a dimethylhydrogen endblocked polydimethylsiloxane (average 15 DP) was then added drop wise via an addition funnel. After the addition of the first 5 grams of the siloxane, 0.83 grams of platinum catalyst (1,3-diethenyl-1,1,3,3-tetramethyldisiloxane platinum complex in dimethyl siloxane) was added to the mixture. The siloxane addition was completed and then a further 0.58 gram of catalyst was added. Following the charge of the flask, the reactants were mixed for 1 hour allowing the reaction to take place. The reaction mixture was then heated to 120° C., and vacuum was applied slowly to remove the solvent. The Mw of the resulting polymer was a bimodal distribution with 32% of the area having Mw of 13200 and polydispersity of 1.17, with the remaining 68% of the area having Mw of 2800 and polydispersity of 2.93. The melt temperature was 30° C.

Example 3B

Preparation of a Silicone Block Copolymer

A 1000 mL, three neck, round bottom flask equipped with a temperature probe, an electrical stirrer, and a condenser was charged with 40.12 gram of the etherdiamide made in Example 3 and 100.0 g of toluene, and heated to 112° C. for 15 minutes. Then, 120.05 g of a dimethylhydrogen endblocked polydimethylsiloxane (average 100 DP) was then added drop wise via an addition funnel. After the first 5 grams of the siloxane was added, 0.97 gram of platinum catalyst (1,3-diethenyl-1,1,3,3-tetramethyldisiloxane platinum complex in dimethyl siloxane) was added to the mixture. The siloxane addition was completed and then a further 1.18 gram of catalyst was added. Following the charge of the flask, the reactants were mixed for 1 hour allowing the reaction to take place. The reaction mixture was then heated to 120° C., and vacuum was applied slowly and gradually to remove the solvent. The Mw of the resulting polymer was a bimodal distribution with 75% of the area having Mw of 29700 and polydispersity of 1.54, with the remaining 25% of the area having Mw of 2800 and polydispersity of 2.93. The melt temperature was 23° C.

Example 4

Reference

Preparation of an Etherdiamide

A 1000 mL round bottom flask equipped with a thermometer, electrical stirrer, nitrogen sweep, and a condenser, was charged with 160.64 gram of a diproplylenediamine (Tomah DPA-DPG) and 244.1 gram of undecylenic acid (Atofina, France). With the stirring off, the mixture in the flask was purged with nitrogen for 5 minutes to sweep out any oxygen in the headspace. The mixer was then turned on, and the mixture quickly turned to a light yellow color as soon as the two reactants were mixed. The reaction mixture was heated to 220° C. for 1 hour under vacuum with a nitrogen purge to strip out impurities. The reaction mixture was cooled to 150° C., poured onto an aluminum lined pan, and allowed to cool in air without any adverse discoloration. The melt temperature of the etherdiamide was 30° C.

Example 4A

Preparation of a Silicone Block Copolymer

A 500 mL three neck round bottom flask equipped with a temperature probe, an electrical stirrer, and a condenser was charged with 60 gram of the etherdiamide made in Example 4 and 100 g toluene, and heated to 112° C. for 15 minutes. Then 132.5 g of a dimethylhydrogen endblocked polydimethylsiloxane (average 15 DP) was then added dropwise via an addition funnel. After the first 5 grams of the siloxane was added, 0.4 gram of platinum catalyst (1,3-diethenyl-1,1,3,3-tetramethyldisiloxane platinum complex in dimethyl siloxane) was added to the mixture. The siloxane addition was completed and then a further 0.4 gram of catalyst was added. Following the charge of the flask, the reactants were mixed for 1 hour allowing the reaction to take place. The reaction mixture was then heated to 120° C. vacuum applied slowly and gradually to remove the solvent. The Mw of the resulting polymer was 37800 and polydispersity of 3.4. The melt temperature was 25° C.

Example 5

Reference

Preparation of an Etherdiamide

A 500 mL round bottom flask equipped with a thermometer, electrical stirrer, nitrogen sweep, and a condenser, was charged with 72.02 gram of a polyetherdiamine (Huntsman's XTJ-504) and 184.79 gram of undecylenic acid (Atofina, France). With the stirring off, the mixture in the flask was purged with nitrogen for 5 minutes to sweep out any oxygen in the headspace. The mixer was then turned on and the mixture quickly turned to a light yellow color. The reaction mixture was then heated to 120° C. and maintained at temperature for 1 hour, and then increased to 180° C. for 2 hours under vacuum with a nitrogen purge to remove impurities. The reaction mixture was cooled to 150° C., poured onto an aluminum lined pan, and allowed to cool in air without any adverse discoloration. The melt temperature of the etherdiamide was 93° C. The acid number as an indication of the impurities remained in the etherdiamide was 0.28.

Example 5A

Preparation of a Silicone Block Copolymer

A 1000 mL three neck round bottom flask was equipped with a temperature probe, an electrical stirrer, and a condenser. It was charged with 6.12 gram of the etherdiamide of Example 5 made above, 7.22 grams of an etherdiamide (prepared from the reaction of JEFFAMINE D230 and undecylenic acid using the process of Example 5), 180.0 g of a dimethylhydrogen endblocked polydimethylsiloxane (average 100 dp chain), and 100.0 g of toluene, and heated to 112° C. for 15 minutes. After the first 5 grams of the siloxane was added, 0.53 gram of platinum catalyst (1,3-diethenyl-1,1,3,3-tetramethyldwasiloxane platinum complex in dimethyl siloxane) was added to the mixture. The siloxane addition was completed and then a further 0.33 gram of catalyst was added. Following the charge of the flask, the reactants are mixed for 1 hour allowing the reaction to take place. The reaction mixture was then heated to 120° C. and vacuum applied slowly and gradually to remove the solvent. The Mw of the resulting polymer was 78,200 and polydispersity of 7.24. The melt temperature was 23° C.

Example 6

Preparation of an Etherdiamide

A 500 mL round bottom flask equipped with a thermometer, electrical stirrer, nitrogen sweep, and a condenser, was charged with 72.05 gram of polyetherdiamine (Huntsman's XTJ-504) and 184.8 gram of undecylenic acid (Atofina, France). With the stirring off, the mixture in the flask was purged with nitrogen for 5 minutes to sweep out any oxygen in the headspace. The mixer was then turned on, and the mixture quickly turned to a light yellow color. The reaction mixture was then heated to 120° C. and maintained at temperature for 1 hour, and then to 180° C. for 2 hours under vacuum with a nitrogen purge to strip out impurities. The reaction mixture was cooled to 150° C., poured onto an aluminum lined pan, and allowed to cool in air without any adverse discoloration. The melt temperature of the etherdiamide was 93° C. The acid number as an indication of the impurities remained in the etherdiamide was 2.8.

Example 6A

Preparation of a Silicone Block

A 1000 mL three neck round bottom flask equipped with a temperature probe, an electrical stirrer, and a condenser was charged with 24.99 gram of the etherdiamide from Example 6, 23.65 grams of DC 8337 (a diamide functional siloxane, Dow Corning Corporation, Midland Mich.) and 100.0 g toluene, and heated to 112° C. for 15 minutes. Then 154.02 g of a dimethylhydrogen endblocked polydimethylsiloxane (average 15 DP chain) was added dropwise via an addition funnel.

After the first 5 grams of the siloxane was added, 0.38 gram of platinum catalyst (1,3-diethenyl-1,1,3,3-tetramethyldisiloxane platinum complex in dimethyl siloxane) was added to the mixture. The siloxane addition was completed and then a further 0.32 gram of catalyst was added. Following the charge of the flask, the reactants were mixed for 1 hour allowing the reaction to take place. The reaction mixture was then heated to 120° C. and vacuum applied slowly and gradually to remove the solvent. The Mw of the resulting polymer was 47,500 and polydispersity of 3.59. The melt temperature was 86.5 C.

Example 7

Preparation of a Silicone Block Copolymer

A 1000 mL, three neck, round bottom flask equipped with a temperature probe, an electrical stirrer, and a condenser was charged with 12.5 gram of the etherdiamide from Example 6, 35.55 grams of DC 8337 diamide siloxane and 50.0 g toluene, and heated to 112° C., for 15 minutes. Then 154.02 g of a dimethylhydrogen endblocked polydimethyl siloxane (average 15 DP chain) was added dropwise via an addition funnel. After the first 5 grams of the siloxane was added, 0.38 gram of platinum catalyst (1,3-diethenyl-1,1,3,3-tetramethyldisiloxane platinum complex in dimethyl siloxane) was added to the mixture. The siloxane addition was completed and then a further 0.32 gram of catalyst was added. Following the charge of the flask, the reactants were mixed for 1 hour allowing the reaction to take place. The reaction mixture was then heated to 120° C. and vacuum applied slowly and gradually to remove the solvent. The Mw of the resulting polymer was 39,600 and polydispersity of 3.55. The melt temperature was 94.0° C.

Example 8

Preparation of a Silicone Block Copolymer

A 1000 mL three neck round bottom flask equipped with a temperature probe, an electrical stirrer, and a condenser was charged with 150 grams of etherdiamide as prepared in Example 1, and 349.56 gram of a dimethylhydrogen endblocked polydimethylsiloxane (average 15 DP chain) and heated to 140° C. for 15 minutes. Then 3.01 gram of platinum catalyst (1,3-diethenyl-1,1,3,3-tetramethyldisiloxane platinum complex in dimethyl siloxane) was added to the mixture. The reaction mixture was allowed to react for 1 hour to build molecular weight and was poured off. The Mw of the polymer was 19,200 with a polydispersity of 1.55.

Example 9

Preparation of a Silicone Block Copolymer

A 1000 mL three neck round bottom flask equipped with a temperature probe, an electrical stirrer, and a condenser was charged with 120 gram of the etherdiamide made in Example 3 and 300.0 g of isopropyl alcohol, and heated to 80° C. for 15 minutes. Then 120.05 g of a dimethylhydrogen endblocked polydimethylsiloxane (average 100 DP chain) was added dropwise via an addition funnel. After the first 5 grams of the siloxane was added, 2 gram of platinum catalyst (1,3-diethenyl-1,1,3,3-tetramethyldisiloxane platinum complex in dimethyl siloxane) was added to the mixture. The siloxane addition was completed and then a further 2 gram of catalyst was added. Following the charge of the flask, the reactants are mixed for 1 hour allowing the reaction to take place. The reaction mixture was then heated to 120° C., and vacuum applied slowly and gradually to remove the solvent. The Mw of the resulting polymer was a bimodal distribution with 48% of the area having Mw of 21,500 and polydispersity of 1.48, with the remaining 52% of the area having Mw of 3950 and polydispersity of 1.09. The melt temperature was 23° C.

Example 10

Two silicone block copolymer containing polyether-amide units were prepared according to similar procedures as described above using a 100 DP SiH terminated siloxane (A), and two etheramides (referenced as B and C, structures shown below). The resulting $(AB)_n$ and $(AC)_m$ were then further reacted, using similar procedures as described above in a 9/1 mole ratio, to produce a $(AB)_n(AC)_m$ copolymer having an overall weight average molecular weight of 94,900.

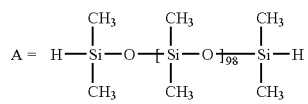

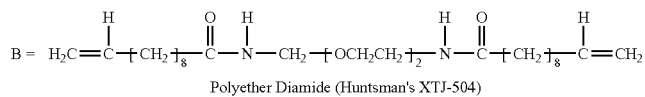

Polyether Diamide (Huntsman's XTJ-504)

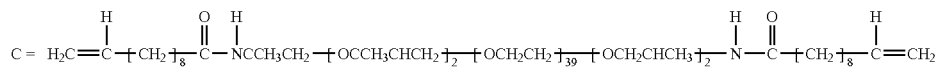

Polyether Diamide (Huntsman's XTJ 502)

Example 11

A silicone block copolymer containing polyether-amide units was prepared according to similar procedures as described above with a siloxane block having a degree of polymerization of 15 and with an etheramide having on average 39 EO units (Huntsman's XTJ-502). The resulting silicone block copolymer had the following average structure;

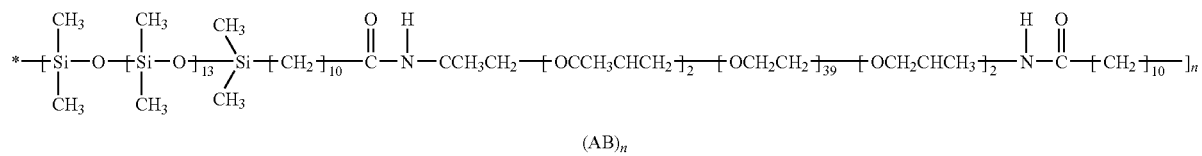

$(AB)_n$

The weight average molecular weight for this silicone block copolymer was 13,400.

Example 12

Emulsions of the silicone block copolymers prepared in Examples 10 and 11 were made according to the following formulation and procedure.

| Component | 12A | 12B |
|---|---|---|
| $(AB)_n$ Silicone Polyether Amide - Example 10 | 20.00 | |
| $(AB)_n$ Silicone Polyether Amide - Example 11 | | 20.00 |
| Tergitol TMN6 | 14.00 | 12.00 |
| IPA | 20.00 | 20.00 |
| Water 1 | 8.00 | 4.00 |
| Acetic Acid 1 | 0.20 | 0.10 |
| Water 2 | 6.00 | 3.00 |

-continued

| Component | 12A | 12B |
|---|---|---|
| Water 3 | 40.00 | 40.90 |
| Final Water | 91.80 | 300.00 |
| Mixing, rpm | 200 | 200 |
| Batch size | 200 | 400 |
| Final Silicone % | 10 | 5 |
| Final Appearance | milky/blue | Clear-Hazy/Yellowish | a) Add polymer and IPA in the beaker and put in warm bath (60-70 C.) for 15 min
b) Mix polymer/IPA blend for 15 min at high speed
c) Add surfactant and mix for 15 min
d) Add water 1 and acetic acid and mix 30 min
e) Add water 2 and mix 30 min
f) Add final water and mix for 1 hr

Example 13

A) Application on Cotton Knit

The emulsions prepared in Example 12, were applied to a cotton knit fabric sample by padding and drying at 160° C. for 2 minutes. Absorbency, whiteness and hand were evaluated, the results are summarized in the table below. Treatments were benchmarked to an amine functional siloxane, which is commonly used for treating textiles, DC 8600 hydrophilic softener (Dow Corning Corporation, Midland, Mich.).

| | Absorbency, sec after drying at 160° C./2 min | Absorbency, sec after yellowing at 160° C./10 min | Whiteness Index after drying 160° C./2 min | Whiteness, sec after yellowing at 160 C./10 min | Hand Rating |
|---|---|---|---|---|---|
| Untreated | Instant | Instant | 79.03 | 72.2 | 1 |
| DC 8600 | 1.1 | 8.4 | 77.44 | 69.38 | 4.5 |
| Emulsion 12 A | 1.5 | 1.05 | 78.86 | 71.78 | 5 |
| Emulsion 12 B | 0.5 | Instant | 77.73 | 71.34 | 4.5 |

B) Application on Cotton Terry

After applied by padding and dried at 160° C. for 2 minutes the fabric showed the following performance. Treatments were benchmarked to DC 8600 hydrophilic softener.

| | Absorbency, sec after drying at 160° C./2 min |
|---|---|
| Untreated | Instant |
| DC 8600 | 0.65 |
| Example 12 A | 1.1 |
| Example 12 B | 0.55 |

The invention claimed is:

1. A method of treating a textile comprising applying to the textile a silicone block copolymer having at least one repeating polyether-amide unit represented by the formula

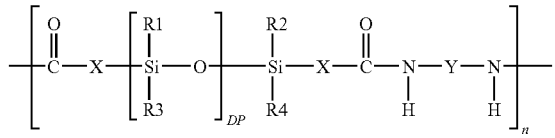

wherein
X is a linear branched $C_1$-$C_{30}$ alkylene chain;
Y is a divalent organic group containing at least one polyoxyalkylene group having the formula —$(C_mH_{2m}O)_z$—, where m is 2 to 4 inclusive, z is 1 to 700,
$R^1$-$R^4$ are independently a monovalent organic group;
DP is an integer having a value of 1-500;
and n is an integer having a value of 1-500.

2. The method of claim 1 wherein the silicone block copolymer is in an emulsion.

3. The method of claim 1 wherein X is a divalent aliphatic hydrocarbon group having 3-10 carbons.

4. The method of claim 1 wherein X is —$(CH_2)_{10}$—.

5. The method of claim 1 wherein the polyoxyalkylene group comprises oxyethylene units —$(C_2H_4O)$—, oxypropylene units —$(C_3H_6O)$—, oxybutylene units —$(C_4H_8O)$—, or mixtures thereof.

6. The method of claim 1 wherein $R^1$-$R^4$ is methyl.

7. A textile treated according to the method of claim 1.

* * * * *